Oct. 6, 1936.  E. HOLM  2,056,900
WEIGHING APPARATUS
Filed July 27, 1934  4 Sheets-Sheet 1

INVENTOR,
Einar Holm
BY
ATTORNEY

Oct. 6, 1936.  E. HOLM  2,056,900
WEIGHING APPARATUS
Filed July 27, 1934  4 Sheets-Sheet 3
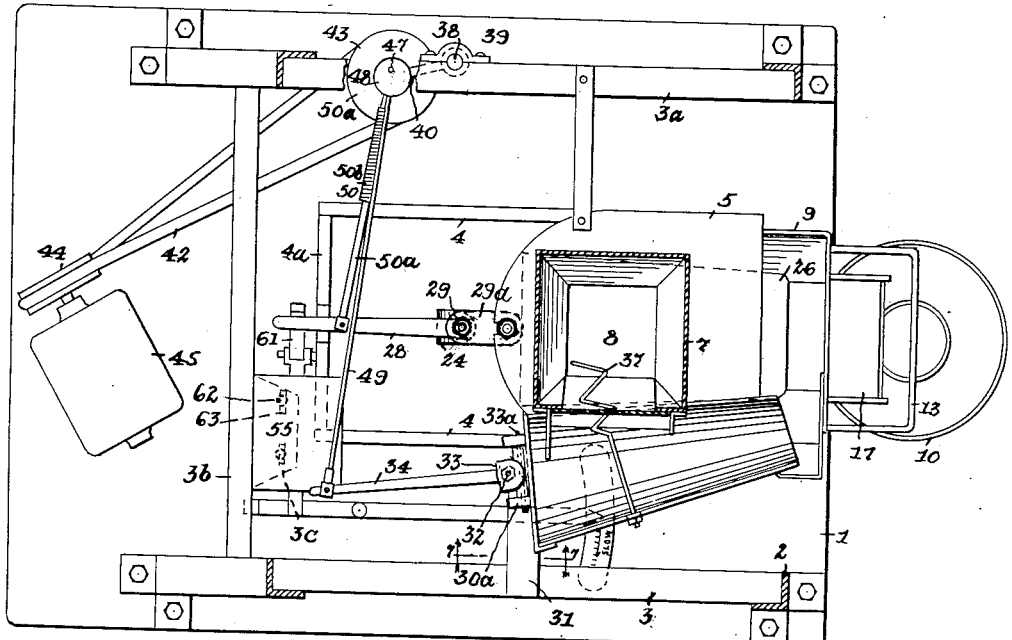
Fig. 3.
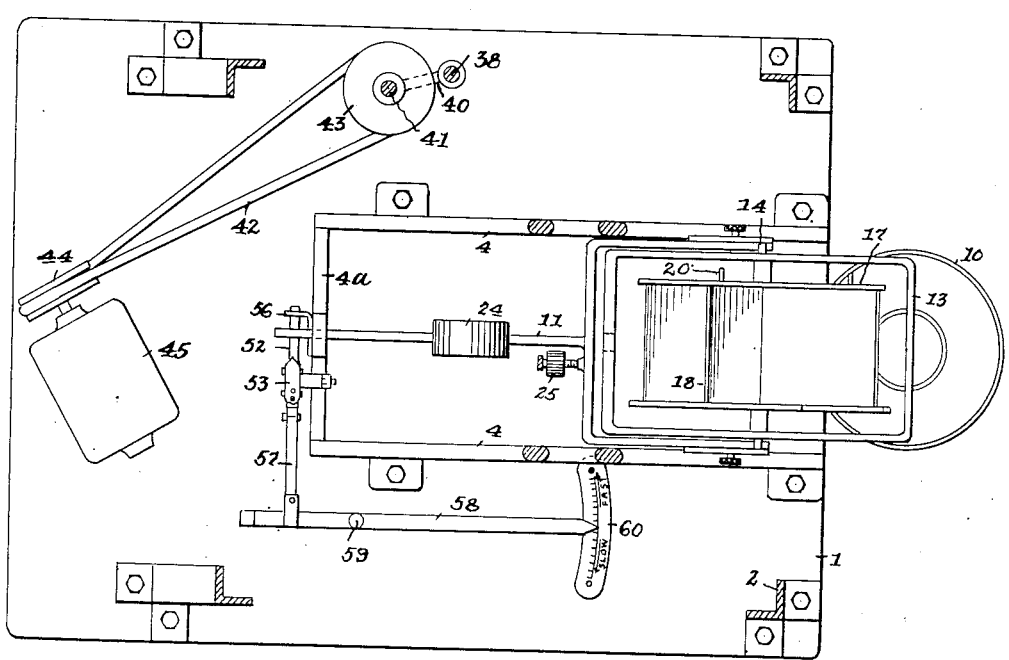
Fig. 4.
INVENTOR,
Einar Holm
BY
ATTORNEY Oct. 6, 1936.  E. HOLM  2,056,900
WEIGHING APPARATUS
Filed July 27, 1934  4 Sheets-Sheet 4

INVENTOR,
Einar Holm
BY
ATTORNEY

Patented Oct. 6, 1936

2,056,900

UNITED STATES PATENT OFFICE 2,056,900

WEIGHING APPARATUS

Einar Holm, Passaic, N. J.

Application July 27, 1934, Serial No. 737,175

9 Claims. (Cl. 249—19)

Apparatus is known by what is termed "non-flowing" material, as candles and other divided solid material of the coarser size, is subjected to the following operations: Placed in a hopper, it is agitated by a scoop-like shaker into which the hopper discharges downwardly; the shaker discharges into one of the cells of a pluri-celled receiver or bucket carried by a weighing beam and, in the elevated position of the beam, held from rotating by a suitable stop; and when the beam moves or tips in response to the weight of the material accumulating in the cell the receiver, clearing the stop, undergoes rotation to discharge its contents into a bag or other container held in receptive position by the attendant. The now unloaded beam returns and these operations are repeated, and so on, continuously. The amount of material desired to be delivered in a run of cycles is of course determined by adjusting weights on the beam, but heretofore there was a variation in the amounts of the various deliveries in a run, and moreover the material was likely to be spilled about, because each discharge to a cell was at constant full flow. In weighing various materials by hand the practice is to deposit as many scoopfuls in the beam-receiver as will bring the beam nearly to balance and then finish off the weighing by dribbling the material into the receiver. My principal object is to improve apparatus for automatically weighing and delivering "non-flowing" material which shall so far imitate this manual operation that this dribbling step will constitute the terminus of each cell-filling operation.

Given a supply of divided solid material and a shaker into which it discharges, my invention includes a constantly moving agitator and a device movable to limit the agitation of the shaker; in the preferred form there is an elastic extensible connection connecting the agitator and shaker permitting a yield between them when the movement of the shaker is thus limited.

Further, given a weighing beam into whose receiver the shaker discharges, there is means to move said device and means, controlled by the beam, for controlling the first-named means; and in the best form this latter means is subject to adjustment.

Figures 1, 8:
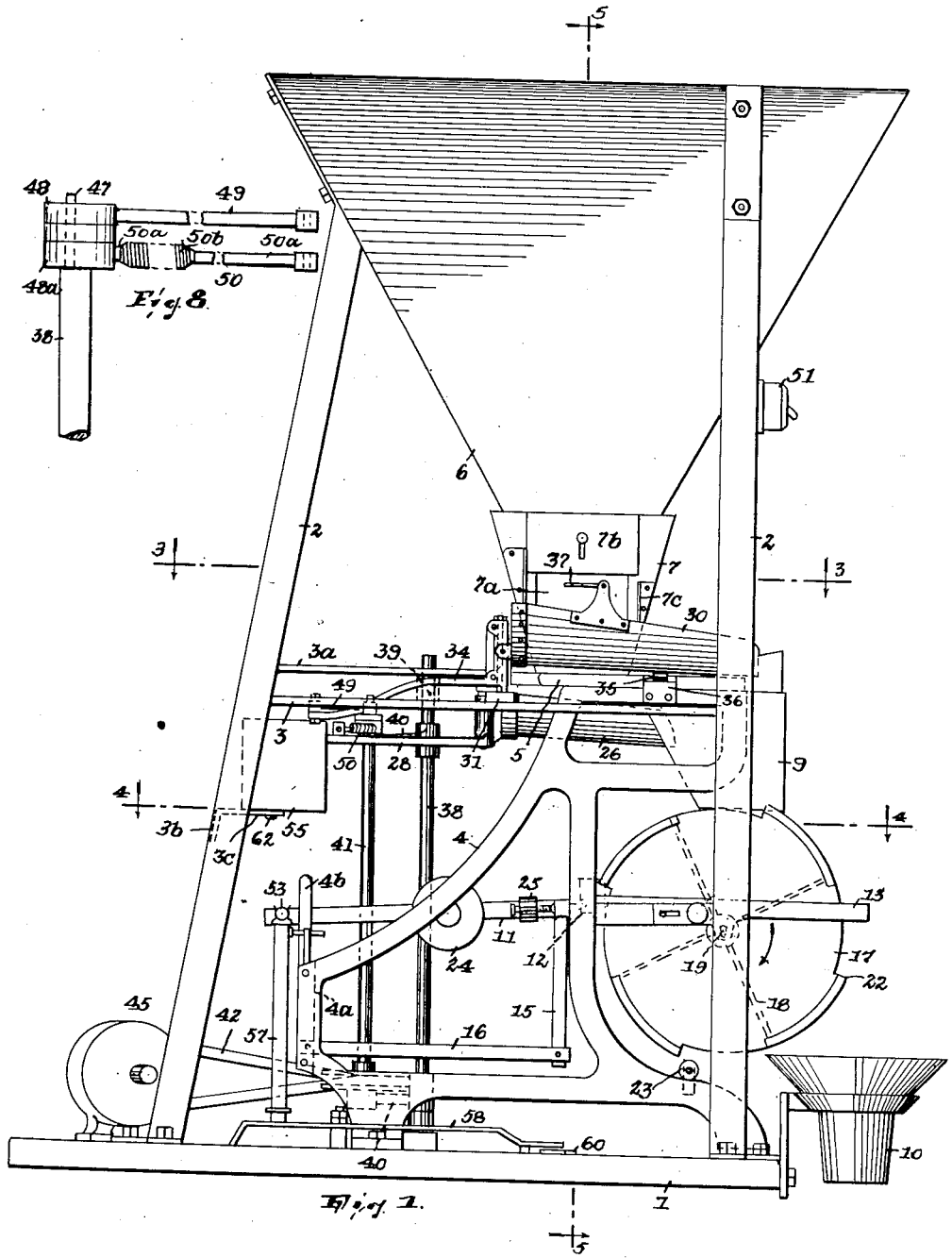
Fig. 1 is a side elevation of the apparatus.
Figure 5:
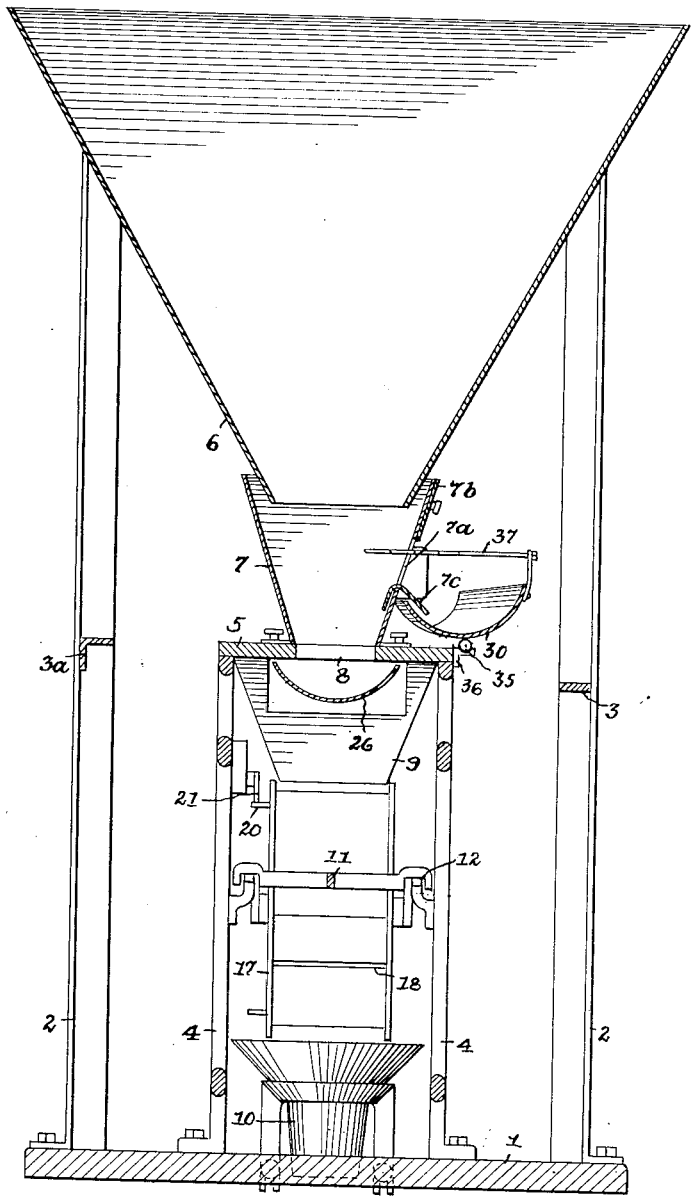

Figs. 3, 4 and 5 are sections on lines 3—3, 4—4 and 5—5, respectively, Fig. 1;

Figs. 6 and 7 are fragmentary elevations of the supporting means for the two shakers, Fig. 7 being partly in section on line 7—7, Fig. 3; and Fig. 8 is a rear elevation of the means for agitating the shakers.

A supporting structure or frame is formed mainly as follows: By a base 1; four standards 2 bolted to the base; a flat brace 3 and an angle-iron brace 3a connecting the standards of the respective side pairs; a brace 3b; two uprights 4 bolted to the base between said pairs of standards and connected by a brace 4a; and a plate 5 surmounting and suitably affixed to the uprights.

A hopper 6 affording the supply for the material and carried by the standards, debouches into a funnel 7 on plate 5 discharging through an opening 8 in the plate. This funnel may be treated as in effect a part of the hopper, it being present according to custom simply to prevent packing and a failure of the material in the hopper to flow. Said funnel also discharges laterally through an opening 7a controlled by a gate 7b and it has an outwardly reaching chute 7c. The stream delivered downwardly through opening 8 is of course superior to that delivered laterally, through opening 7a. Another funnel 9 is carried by the uprights 4 and discharges into a rotary sectional receiver or bucket (17) which in turn is adapted to discharge intermittently into a funnel 10 suitably attached to base 2.

The weighing beam 11 is a forked lever fulcrumed at 12 (Figs. 1, 2 and 5) and having a frame 13 fulcrumed in its fork at 14 and steadied in the movement of the beam by a link 15 pivoted to an arm 16 projecting from the frame. The receiver 17 comprises two spaced disks connected by radial walls 18 so as to form sector-shaped cells of equal capacity open at the periphery. It is journaled at 19 in frame 13 and when unloaded and elevated one of four pins 20 thereon engages a stop 21 preventing the receiver from turning; when the uppermost cell becomes filled and the receiver descends with the beam the stop is cleared so that the receiver turns to deliver into funnel 10, the now ensuing rise of the receiver with the beam resulting in the next pin engaging the stop. Peripheral shoulders 22 on the receiver are adapted to ride over a roller 23 to prevent backward rotation of the receiver. Adjustable weights 24 and 25 on the beam determine the quantity supplied to any cell before the beam tips under the delivered load. The tipping and return movements of the beam are intermittent and quick relatively to the time required for filling a cell. I make no claim to the foregoing, or to the combination therewith, broadly, of a shaker, such as 26 to be referred to, which agitates the material in the hopper at the bottom and so insures its flow, such being already known. All that is material here with respect to my invention is that there is a weighing beam having a receiver and that, as will appear, the movement of the beam controls the agitation of said shaker.

Such shaker 26 is arranged under plate 5 to receive the material from the hopper and it discharges into funnel 9, being supported for horizontal oscillation as follows: At the back (Fig. 6) it has a fixture 27 including a rearwardly extending arm 28 and by this fixture it is pivoted on a bolt 29 clamped to an arm 29a in turn secured to the back of plate 5.

Under the chute is a scoop-like dribble shaker 30, supported as follows: An arm 31 (Fig. 7) projects inwardly from brace 3 and has a terminal bearing 31a in which is journaled a vertical bolt 32. Above the bearing the bolt has fast thereon a fixture 33 provided with a horizontal pin 33a affording a pivot for lugs 30a on the back of the shaker and having a rearwardy extending arm 34. This shaker may have an agitating arm 37 projecting into opening 7a. It is supported at its front end on a roller 35 journaled in a bracket 36 attached to the near upright 4. (I may support the main shaker 26 in the same way, to wit, through a gimbal joint such as is characterized by parts 32, 33 and 30a, and by a roller, as 35, at its forward end; and in either case if the bottom of the shaker is convex-rounded—Fig. 5—the agitation incident to the horizontal oscillation will be augmented by some vertical motion.)

At 38 is an upright post fixed to the base 1 and to brace 3a at 39 (Figs. 1, 3 and 4), and in brackets 40 projecting from this post is journaled a shaft 41 driven by a belt 42 engaging the pulleys 43 and 44 on said shaft and the armature shaft of a motor 45 secured to the base. At its upper end shaft 41 has an eccentric pin 47 and thus forms the mentioned agitator, and to this pin the heads 48 and 48a of connections 49 and 50 pivoted to the arms 28 and 34 of the two shakers are respectively connected. Connection 49 is a non-extensible rod, but the connection 50 comprises two terminals 50a joined by a helical spring 50b so that this connection is extensible and elastically resists extension (Fig. 8). The motor is put in circuit (the circuit being not shown) by a switch 51 (Fig. 1).

Figure 2:
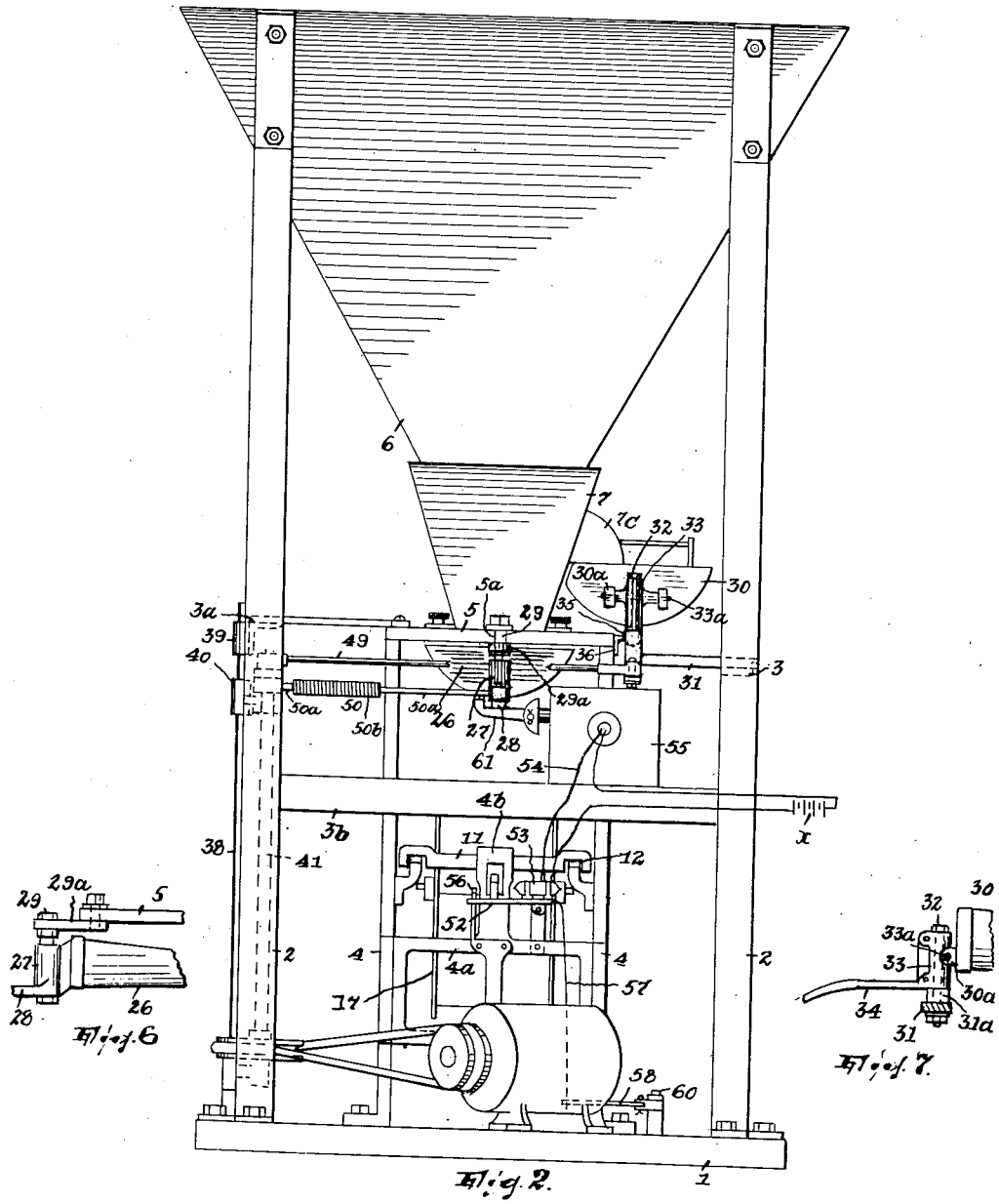
Fig. 2 is a rear elevation thereof.

When the switch is operated to cause the motor to be driven both shakers are constantly oscillated for the first part of each filling of a cell, but for the last part the oscillation of the main shaker is automatically arrested while that of the dribble shaker continues so that by the small stream of material thus left flowing (by the dribble shaker alone) an accurate measurement of the quantity predetermined to be delivered (by adjusting the weights) to the cell is possible. (As will be apparent, the main shaker in a given time, and when operating, delivers more material than the dribble shaker.) This arresting of the main shaker is effected as follows:

On the brace 4a (which provides an apertured upstanding arm 4b through whose aperture the beam lever projects) is fulcrumed a circuit-maker comprising a lever 52 and a mercury circuit-closer 53 thereon and which, when tilted clockwise in Fig. 2, closes the circuit 54 having any source of current, as a battery x, and an electro-magnet in the form here of a solenoid, 55. The circuit-maker projects under the rear end of the beam-lever and is urged in the clockwise direction (to a limit afforded by a stop 56) by a plate-spring 57 (Figs. 2 and 4) attached to one arm of a lever 58 fulcrumed at 59 and coacting as a pointer with a dial 60; the spring tends to depress the receiver-carrying end of the beam, at least in the elevated position of said end, such tendency being least when the pointer-lever is at the limit "Fast" and greatest when the pointer-lever is at the limit "Slow" in Fig. 4. According to the degree of effort which, by adjusting the pointer-lever, the spring coacts with the accumulating load of material in the receiver to shift the beam, with consequent movement of the circuit-maker, so the agitation of the main shaker is sooner or later arrested, while the dribble shaker continues being agitated, by the following means: The solenoid core or armature terminates in a hook 61 which, until the circuit-maker is thus shifted to close circuit 54, stands to the left in Fig. 2 clear of the then oscillating shaker arm 28; but when the circuit-maker is shifted and close the circuit the hook is drawn by the solenoid to the right and so holds the main shaker against oscillation, spring 50b yielding to the impulses of the agitator.

What I aim at by my invention is to finish off the flow of the material to any cell of the receiver as a dribble. Some materials do not flow readily except in the downward direction from the hopper, wherefore a dribble shaker for receiving the lateral flow would be functionless. I may therefore so limit the oscillation of the main shaker from the agitator as to effect a dribble by such shaker after it has oscillated to effect the main flow for a predetermined time. Thus, in Figs. 1 and 3 the brace 3b has an extension 3c supporting the solenoid and the latter is secured by screws 62 engaged in slots 63 in said extension which extend lengthwise of the solenoid core. By adjusting the solenoid lengthwise of its core it may be brought to a position where, when the solenoid is energized, the core on retraction will not limit the shaker arm 28 completely against oscillation but will limit only the extent of such oscillation.

When the pointer-lever is placed at "Slow" the spring 57 is under maximum tension and so brings the dribble into effect sooner than when the pointer-lever is placed at "Fast." And since for delivering a given quantity of the material to a cell more time in the first case is devoted to dribbling than in the second case the filling time in the first case is longer; in other words, the deliveries to the funnel 10 occur between longer intervals in the first case than in the second. By adjusting the pointer-lever, therefore, the length of time between deliveries may be varied according to the requirements of the material being handled.

I claim:

1. Apparatus of the class described comprising a supply for divided solid material, a shaker into which the supply discharges, a constantly moving agitator, an elastic extensible agitation-transmitting connection connecting the agitator and shaker, and a device movable into position to limit the movement which the agitator tends to impart to the shaker.

2. Apparatus of the class described comprising a supply for divided solid material, a shaker into which the supply discharges, constantly moving means to move the shaker impositively back and forth, means movable into position to obstruct and so limit the movement which the first means tends to impart to the shaker, a weighing beam having a receiver into which the shaker discharges, and means, controlled by the beam, for controlling the second-named means.

3. Apparatus of the class described comprising a supply for divided solid material, a shaker into which the supply discharges, constantly moving means to move the shaker impositively back and forth, a device movable into position to obstruct and so limit the movement which said means tends to impart to the shaker, an electric circuit containing a magnet having said device as its armature, a circuit-maker for the circuit, and a weighing beam having a receiver into which the shaker discharges and controlling the circuit-maker.

4. Apparatus of the class described comprising a supply for divided solid material, a shaker into which the supply discharges, constantly moving means to move the shaker impositively back and forth, a device movable into position to obstruct and so limit the movement which said means tends to impart to the shaker, an electric circuit containing a magnet having said device as its armature, a circuit-maker for the circuit, a weighing beam having a receiver into which the shaker discharges, and a spring normally urging the circuit-maker toward circuit-closing position and coacting with the accumulating load of material in the receiver to tip the beam.

5. Apparatus of the class described comprising a supply for divided solid material, a shaker into which the supply discharges, constantly moving means to move the shaker impositively back and forth, a device movable into position to obstruct and so limit the movement which said means tends to impart to the shaker, an electric circuit containing a magnet having said device as its armature, a circuit-maker for the circuit, a weighing beam having a receiver into which the shaker discharges, a spring normally urging the circuit-maker toward circuit-closing position and coacting with the accumulating load of material in the receiver to tip the beam, and means to adjust the tension of the spring.

6. Apparatus of the class described comprising a supply for divided solid material having means to deliver the material in two streams of different volumes, a main shaker and a dribble shaker respectively arranged to receive the material of the superior and inferior streams, constantly moving means to move the two shakers impositively back and forth, and means, movable to a position which is in the path of the main shaker but out of the path of the dribble shaker, to obstruct and so limit the movement which the second-named means tends to impart to the main shaker.

7. Apparatus of the class described comprising a supply for divided solid material having means to deliver the material in two streams of different volumes, a main shaker and a dribble shaker respectively arranged to receive the material of the superior and inferior streams, a constantly moving agitator, agitation-transmitting connections connecting the agitator with the respective shakers, the connection for the main shaker being extensible and elastic, and a device movable into position to limit the agitating movement of the main shaker.

8. Apparatus of the class described comprising a supply for divided solid material having means to deliver the material in two streams of different volumes, a main shaker and a dribble shaker respectively arranged to receive the material of the superior and inferior streams, constantly moving means to move the two shakers impositively back and forth, means movable into position to obstruct and so limit the movement which the second-named means tends to impart to the main shaker, a weighing beam having a receiver into which the two shakers discharge, and means, controlled by the beam, for controlling the third-named means.

9. Apparatus of the class described comprising a hopper for divided solid material having a lateral discharge outlet, a shaker into which said outlet discharges, and means for agitating the shaker, said shaker having an agitating arm projecting through the outlet.

EINAR HOLM.